US012808251B2

(12) United States Patent
Isobe

(10) Patent No.: US 12,808,251 B2
(45) Date of Patent: Nov. 24, 2026

(54) VEHICULAR OPENING/CLOSING BODY CONTROL DEVICE FOR ACHIEVING PROPER MOVEMENT SPEED OF OPENING/CLOSING BODY

(71) Applicant: MITSUBA Corporation, Gunma (JP)

(72) Inventor: Yoshiaki Isobe, Gunma (JP)

(73) Assignee: MITSUBA Corporation, Gunma (JP)

( * ) Notice: Subject to any disclaimer, the term of this patent is extended or adjusted under 35 U.S.C. 154(b) by 841 days.

(21) Appl. No.: 17/049,338

(22) PCT Filed: Apr. 12, 2019

(86) PCT No.: PCT/JP2019/015963
§ 371 (c)(1),
(2) Date: Oct. 21, 2020

(87) PCT Pub. No.: WO2019/216119
PCT Pub. Date: Nov. 14, 2019

(65) Prior Publication Data

US 2021/0363810 A1 Nov. 25, 2021

(30) Foreign Application Priority Data

May 8, 2018 (JP) ................................ 2018-089813

(51) Int. Cl.
*B60J 5/06* (2006.01)
*E05F 15/60* (2015.01)
*E05F 15/70* (2015.01)

(52) U.S. Cl.
CPC .............. *E05F 15/70* (2015.01); *E05F 15/60* (2015.01); *B60J 5/06* (2013.01); *E05Y 2201/434* (2013.01);

(Continued)

(58) Field of Classification Search
USPC ........................................................... 701/49
See application file for complete search history.

(56) References Cited

U.S. PATENT DOCUMENTS 10,208,520 B2 * 2/2019 Long ........................ G01L 3/242
2002/0093301 A1 * 7/2002 Itami ...................... E05F 15/632 318/443

(Continued)

FOREIGN PATENT DOCUMENTS

JP H11166356 6/1999
JP H11342740 12/1999

(Continued)

OTHER PUBLICATIONS

"International Search Report (Form PCT/ISA/210)" of PCT/JP2019/015963, mailed on Nov. 6, 2019, with English translation thereof, pp. 1-4.

*Primary Examiner* — Abby J Flynn
*Assistant Examiner* — Sean Patrick Reidy
(74) *Attorney, Agent, or Firm* — JCIPRNET

(57) ABSTRACT

Disclosed is a vehicular opening/closing body control device including: a positional information acquisition part; a storage part; and a motor control part. The motor control part includes: a drive start part that operates the motor based on the positional information so that the opening/closing body in a stopped state is moved; and a drive part that performs feedback control of the motor based on the positional information and the target value so that the movement speed of the opening/closing body which has been started to move by the drive start part reaches the target value. The drive start part generates a first output in the motor when the opening/closing body is at a first position, and generates a second output smaller that the first output in the motor when the opening/closing body is at a second position closer to a fully closed position than the first position.

13 Claims, 9 Drawing Sheets

(52) U.S. Cl.
CPC ....... *E05Y 2400/32* (2013.01); *E05Y 2400/36* (2013.01); *E05Y 2400/40* (2013.01); *E05Y 2400/44* (2013.01); *E05Y 2800/30* (2024.05); *E05Y 2900/531* (2013.01)

(56) References Cited

U.S. PATENT DOCUMENTS

| | | | | |
|---|---|---|---|---|
| 2005/0012482 A1* | 1/2005 | Kidokoro | ............... | G05B 19/19<br>318/280 |
| 2005/0179409 A1* | 8/2005 | Honma | ................... | E05F 15/41<br>318/62 |
| 2017/0081899 A1* | 3/2017 | Kaino | ..................... | E05F 15/42 |

FOREIGN PATENT DOCUMENTS

| | | |
|---|---|---|
| JP | 2002339651 | 11/2002 |
| JP | 2006183391 | 7/2006 |
| JP | 2009249871 | 10/2009 |
| JP | 2016089456 | 5/2016 |

* cited by examiner

VEHICULAR OPENING/CLOSING BODY CONTROL DEVICE FOR ACHIEVING PROPER MOVEMENT SPEED OF OPENING/CLOSING BODY

CROSS-REFERENCE TO RELATED APPLICATION

This application is a 371 application of the international PCT application serial no. PCT/JP2019/015963, filed on Apr. 12, 2019, which claims the priority benefit of Japan application no. 2018-089813, filed on May 8, 2018. The entirety of each of the above-mentioned patent applications is hereby incorporated by reference herein and made a part of this specification.

BACKGROUND

Technical Field

The present invention relates to a vehicular opening/closing body control device.

Related Art

A technique is known which reduces, when closing an opening/closing body between a fully open position and a fully closed position (that is, an intermediate position), a target value of the movement speed of the opening/closing body corresponding to the position of the opening/closing body in comparison with a case of closing the opening/closing body in the fully closed position (for example, Patent literature 1).

LITERATURE OF RELATED ART

Patent Literature

Patent literature 1: Japanese Patent Laid-open No. 2006-183391

SUMMARY

Problems to be Solved

However, in the above-mentioned conventional technique, it is difficult to achieve a proper movement speed (initial speed) of the opening/closing body during the initial motion of the opening/closing body when closing the opening/closing body which is between the fully open position and the fully closed position. When the opening/closing body is relatively close to the fully closed position, the user may feel too fast if the opening/closing body moves at a relatively high speed during or after the initial motion.

Moreover, an output generated in a motor when closing the opening/closing body is generally set so that the opening/closing body can start moving in a closing direction (closing operation) even when the vehicle is tilted, or when the opening/closing body is subjected to a relatively large friction due to a low temperature environment or the like. Therefore, when the vehicle is not tilted or the like, the output generated in the motor when closing the opening/closing body may be higher than necessary.

Therefore, in one aspect, an object of the present invention is to achieve a proper movement speed of an opening/closing body during the initial motion of the opening/closing body when closing the opening/closing body which is between the fully open position and the fully closed position.

Means to Solve Problems

In one aspect, there is provided a vehicular opening/closing body control device including:

a positional information acquisition part for acquiring positional information about an opening/closing body of a vehicle;

a storage part for storing a target value of the movement speed of the opening/closing body corresponding to the position of the opening/closing body; and a motor control part for controlling a motor opening/closing the opening/closing body, wherein the motor control part includes:

a drive start part configured to operate the motor based on the positional information acquired by the positional information acquisition part so that the opening/closing body in a stopped state is moved; and a drive part configured to perform feedback control of the motor based on the positional information acquired by the positional information acquisition part and the target value stored in the storage part so that the movement speed of the opening/closing body which has been started to move by the drive start part reaches the target value, the drive start part generates a first output in the motor when the position of the opening/closing body in the stopped state acquired by the positional information acquisition part is a first position, and generates a second output smaller that the first output in the motor when the position of the opening/closing body in the stopped state acquired by the positional information acquisition part is a second position closer to a fully closed position than the first position, the second output being.

Effect

In one aspect, according to the present invention, when closing the opening/closing body which is between the fully open position and the fully closed position, a proper movement speed of the opening/closing body during the initial motion of the opening/closing body can be achieved.

DESCRIPTION OF THE EMBODIMENTS

First Embodiment

Hereinafter, each example of a first embodiment is described in detail with reference to the accompanying drawings.

Hereinafter, a case in which a sliding door (not shown) is an example of the opening/closing body is described. The sliding door is generally arranged on a side part of the vehicle and is electrically opened and closed. Moreover, in the operation of opening the sliding door (hereinafter referred to as "opening operation"), the sliding door moves toward the rear of the vehicle, and in the operation of closing the sliding door (hereinafter referred to as "closing operation"), the sliding door moves toward the front of the vehicle.

Figure 1:
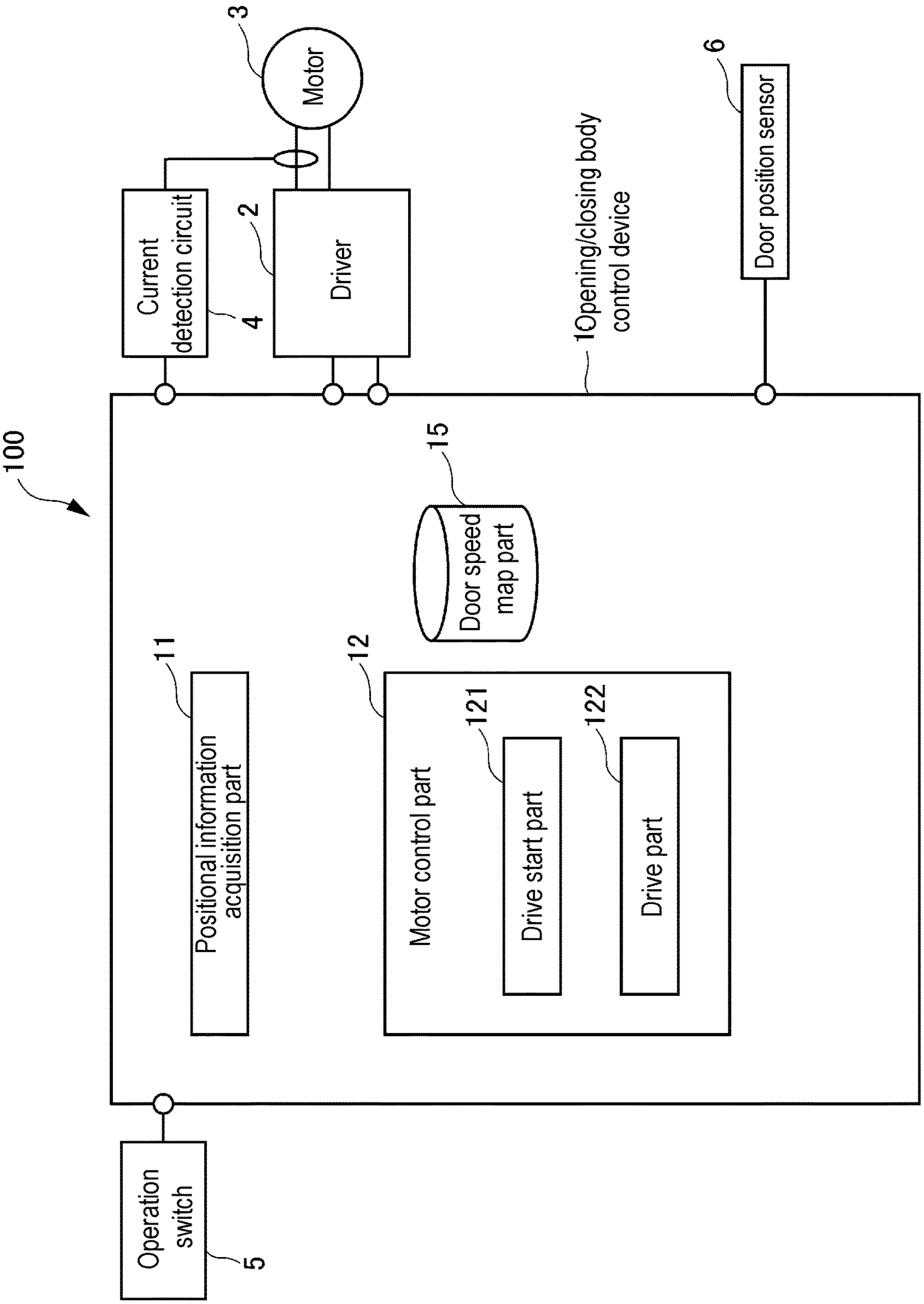
FIG. 1 is a schematic block diagram showing configurations of a motor device and an opening/closing body control device according to an embodiment.

FIG. 1 is a schematic block diagram showing configurations of a motor device 100 and an opening/closing body control device 1 according to an embodiment.

The motor device 100 includes an opening/closing body control device 1, a driver 2, a motor 3, a current detection circuit 4, an operation switch 5, and a door position sensor 6.

The opening/closing body control device 1 is realized by a computer such as an electronic control unit (ECU). The opening/closing body control device 1 includes, for example, a central processing unit (CPU), a read only memory (ROM) for storing a control program, a readable and writable random access memory (RAM) for storing a calculation result and the like, a timer, a counter, an input interface and an output interface.

The motor 3 is connected to the opening/closing body control device 1 via the driver 2, and the operation switch 5 and the door position sensor 6 are also connected to the opening/closing body control device 1. The function of the opening/closing body control device 1 is described below.

The driver 2 is formed by a switching element (not shown).

The motor 3 is a drive source that drives the sliding door. As described later, a voltage is applied to the motor 3 via the driver 2.

The current detection circuit 4 is a circuit that detects a current flowing between the driver 2 and the motor 3. The current detection circuit 4 outputs a signal corresponding to the detected current value to the opening/closing body control device 1. Moreover, the detected current value may be used for object-catching detection.

The operation switch 5 outputs a signal for instructing the opening operation and the closing operation of the sliding door to the opening/closing body control device 1. The opening/closing body control device 1 drives the motor 3 according to a signal input from the operation switch 5.

The door position sensor 6 is a sensor that generates a pulse signal for detecting the movement and position of the sliding door. For example, the door position sensor 6 may be a Hall element or the like which is installed on a drum or the like that winds a wire (not shown) connecting the motor 3 and the sliding door. The door position sensor 6 outputs a pulse signal every time the sliding door moves by a predetermined amount.

The opening/closing body control device 1 includes a positional information acquisition part 11, a motor control part 12, and a door speed map part 15 (an example of a storage part). The positional information acquisition part 11 and the motor control part 12 can be realized by, for example, executing a program stored in a storage device (for example, ROM) by the CPU. In addition, the door speed map part 15 can be realized by, for example, a storage device (for example, ROM).

The positional information acquisition part 11 counts the number of times of switching of the pulse signal output by the door position sensor 6, detects the position of the sliding door from the counted number, and generates positional information indicating the detected position of the sliding door. In addition, the positional information acquisition part 11 detects the moving direction (opening direction or closing direction) of the sliding door from the pulse signal output from the door position sensor 6, and generates moving direction information indicating the detected moving direction of the sliding door.

When a signal indicating the opening operation is input from the operation switch 5, the motor control part 12 controls the motor 3 in a control mode of moving the sliding door in the opening direction at a target value of the movement speed. Specifically, the motor control part 12 reads the target value of the movement speed of the sliding door stored in the door speed map part 15 and set for each position of the sliding door, and switches on/off the switching element of the driver 2 by pulse width modulation (PWM) control, thereby applying a voltage to the motor 3 so as to achieve the target value of the movement speed of the sliding door.

In addition, when a closing operation instruction is input from the operation switch 5, the motor control part 12 controls the motor 3 in a control mode of moving the sliding door in the closing direction at the target value of the movement speed. Specifically, the motor control part 12 reads the target value of the movement speed of the sliding door stored in the door speed map part 15 and set for each position of the sliding door, and switches on/off the switching element of the driver 2 by the PWM control, thereby applying a voltage to the motor 3 so as to achieve the target value of the movement speed of the sliding door.

The motor control part 12 includes a drive start part 121 and a drive part 122.

When the closing operation instruction is input from the operation switch 5, the drive start part 121 operates the motor 3 based on the positional information so as to move the sliding door in a stopped state. That is, the drive start part 121 operates the motor 3 so as to cause the initial motion of the sliding door. The sliding door in the stopped state is a sliding door with the movement speed thereof being substantially zero. Moreover, generally, when the motor 3 is in the stopped state, the sliding door is also in the stopped state.

In one embodiment, the drive start part 121 generates a first output in the motor 3 when the sliding door is at a first position, and generates a second output smaller than the first output in the motor 3 when the sliding door is at a second position closer to the fully closed position than the first position. The higher the duty that determines the ON time of the switching element of the driver 2, the higher the output of the motor 3. Therefore, when the sliding door is at the second position, the drive start part 121 drives the motor 3 with a lower duty than when the sliding door is at the first position.

Here, the first output may correspond to the maximum value of the output generated in the motor 3 by the drive start part 121. The first output is adapted to cause the initial motion of the sliding door even when the vehicle is tilted or when the sliding door is subjected to a relatively large friction due to a low temperature environment or the like.

The first position is, for example, the fully open position, and the second position is near the fully closed position. For example, the second position may be each position in a section from the fully closed position to a predetermined distance in the opening direction (hereinafter, also referred to as "initial low speed section"). The initial low speed section does not include the fully closed position. The reason is that the closing operation is unnecessary at the fully closed position. The initial low speed section is a section in which the target value of the movement speed of the sliding door (see FIG. 2) is relatively low. An example of the initial low speed section is described later.

When the sliding door is not moved by a first predetermined amount or more even if the second output is generated in the motor 3, the drive start part 121 generates the first output in the motor 3. The first predetermined amount is optional, and may correspond to, for example, one pulse from the door position sensor 6.

Accordingly, by generating the second output being a relatively small output in the motor 3 in an early stage, the movement speed of the sliding door during the initial motion can be reduced, and if the sliding door does not initially move at the second output, the sliding door can be reliably started by generating the first output in the motor 3.

In another example, the drive start part 121 generates a third output in the motor 3 when the sliding door does not move by the first predetermined amount or more even if the second output is generated in the motor 3. The third output is larger than the second output but smaller than the first output. Besides, the drive start part 121 generates the first output in the motor 3 when the sliding door does not move by the first predetermined amount or more even if the third output is generated in the motor 3.

In addition, in still another example, when the sliding door does not move by the first predetermined amount or more even if the second output is generated in the motor 3, the drive start part 121 generates a third output which is larger than the second output by a predetermined output. The third output is larger than the second output by the predetermined output but smaller than the first output. Besides, when the third output is generated in the motor 3, the drive start part 121 gradually increases the third output toward the first output until the sliding door moves in the closing direction by the first predetermined amount or more. For example, the drive start part 121 increases the third output by a predetermined output every time a predetermined time (for example, 100 ms) elapses.

The drive part 122 performs feedback control of the motor 3 so that the movement speed of the sliding door which has been started to move by the drive start part 121 reaches the target value. For example, the drive part 122 performs proportional-integral (PI) control based on the target value of the movement speed (stored in the door speed map part 15) and the positional information. In place of the PI control, proportional-integral-differential (PID) control may also be realized.

The door speed map part 15 stores the target value of the movement speed of the sliding door, which is associated with each position of the sliding door. Here, the target value is set in consideration of safety and convenience. Moreover, instead of the target value of the movement speed, a target value of the voltage applied to the motor 3 to achieve the target value may be defined in the door speed map part 15.

Figure 2:
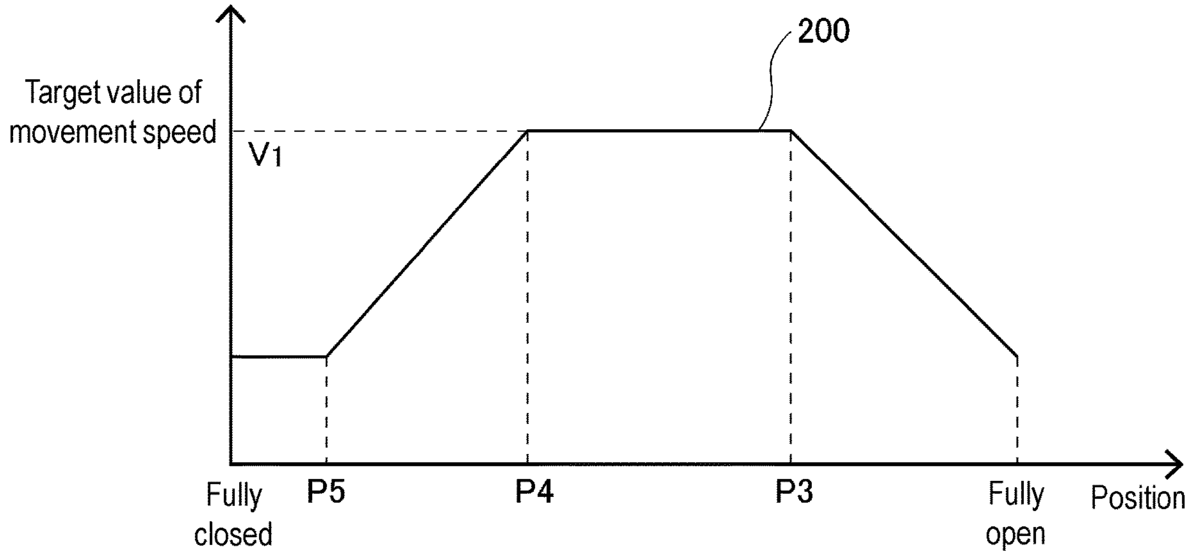
FIG. 2 is an explanatory diagram of a door speed map.

FIG. 2 is an explanatory diagram of a door speed map in the door speed map part 15. FIG. 2 shows a characteristic 200 that represents a relationship between the position of the sliding door and the target value of the movement speed, with the horizontal axis representing the position of the sliding door and the vertical axis representing the target value of the movement speed.

In FIG. 2, the target value corresponding to the position of the sliding door increases as the sliding door moves from the fully open position toward a position P3 (an example of a third position) in the closing direction, is a constant value $V_1$ when the sliding door moves from the position P3 to a position P4 (an example of a fourth position) in the closing direction, and decreases as the sliding door moves from the position P4 (an example of the fourth position) to a position P5 (an example of a fifth position) in the closing direction.

Moreover, in the section in which the sliding door moves from the fully open position toward the position P3 in the closing direction, the target value corresponding to the position of the sliding door linearly increases in proportion to the change in the position of the sliding door (change in the closing direction). However, the target value may also increase non-linearly. Similarly, in the section in which the sliding door moves from the position P4 to the position P5 in the closing direction, the target value corresponding to the position of the sliding door linearly decreases in proportion to the change in the position of the sliding door (change in the closing direction). However, the target value may also decrease non-linearly. Additionally, in the section in which the sliding door moves from the position P3 to the position P4 in the closing direction, there may be a slight change in the target value corresponding to the position of the sliding door. Besides, the target value corresponding to the fully open position may be the same as or different from the target value corresponding to the fully closed position.

In the present embodiment, as an example, the initial low speed section corresponds to the section from the position P5 to the fully closed position. Therefore, the drive start part 121 generates the second output in the motor 3 when the sliding door is located in the initial low speed section. However, in other examples, the initial low speed section may be a part of the section from the position P5 to the fully closed position, or may be a section that includes the section from the position P5 to the fully closed position and includes a part or all of the section from the position P5 to the position P4. In addition, the initial low speed section may not include the section immediately before the fully closed position. The section immediately before the fully closed position may correspond to a section in which only an opening that virtually eliminates the possibility of the user's hands or the like being caught is formed between the sliding door and the body.

Figure 3:
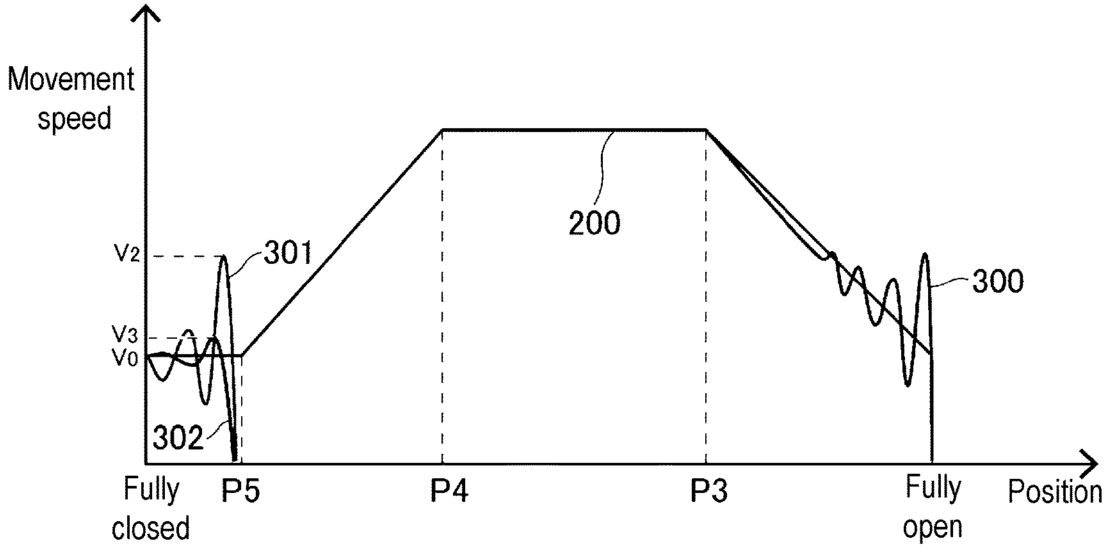
FIG. 3 is a diagram describing effects of the present embodiment.

FIG. 3 is a diagram for describing the effect of the present embodiment. FIG. 3 shows characteristics 300 to 302 that represent the relationship between the position of the sliding door and the movement speed, with the horizontal axis representing the position of the sliding door and the vertical axis representing the movement speed of the sliding door. FIG. 3 also shows the characteristic 200 shown in FIG. 2.

The characteristics 300 to 302 are characteristics when the closing operation is performed, and the characteristic 300 is a characteristic when the closing operation is performed without stopping halfway from the fully open position to the fully closed position. In addition, the characteristics 301 to 302 are characteristics when the sliding door in the stopped state is caused to perform the closing operation at a position slightly closer to the fully closed position than the position P5, the characteristic 301 is a characteristic according to a second comparative example described later, and the characteristic 302 is a characteristic according to the present embodiment.

Meanwhile, in a first comparative example in which the PI control is performed from the time of initial motion without arranging the drive start part 121, the output of the motor 3 may be insufficient and may be diagnosed as a sensor pulse failure state under a severe load condition. Moreover, the sensor pulse failure state is diagnosed when, for example, there is no input (pulse) from the door position sensor 6 for 250 ms from the start of operation of the motor 3. The severe load condition is, for example, a case in which the vehicle inclines at 17 degrees forwardly downward, or a case in which a relatively large friction is applied to the sliding door due to a low temperature environment or the like.

In this regard, in the present embodiment, as described above, the drive start part 121 is arranged, and the PI control is executed after the movement of the sliding door is started by the drive start part 121. Accordingly, the possibility that the output of the motor 3 becomes insufficient and is diagnosed as the sensor pulse failure state can be reduced even under inconvenience in the case of the first comparative example, that is, under the severe load condition.

Besides, in the second comparative example in which the drive start part is arranged but the output of the motor 3 during the initial motion is always set to a constant value (for example, the first output), the inconvenience in the case of the first comparative example can be avoided, but it is difficult to achieve a proper movement speed (initial speed) of the sliding door during initial motion of the sliding door.

For example, as shown by the characteristic 301 in FIG. 3, when the sliding door is relatively close to the fully closed position (that is, when the door opening is relatively narrow), if the movement speed of the sliding door during the initial motion is relatively high, the user may feel that the movement speed of the sliding door is too fast. That is, in the characteristic 301 of FIG. 3, the maximum movement speed during the initial motion is a relatively large value $V_2$, which is significantly larger than a target value $V_0$ of the movement speed at this position.

Moreover, if the sliding door is relatively far from the fully closed position (for example, in a section from the position P3 to the fully open position in FIG. 2), the user may not feel too fast even if the movement speed of the sliding door during the initial motion is relatively high, thereby enabling the closing operation of the sliding door without giving the user a feeling of discomfort. In addition, for example, when the movement speed of the sliding door is significantly lower than the constant value $V_1$ in the section from the position P3 to the position P4 in FIG. 2, the closing speed of the sliding door becomes too slow, which may give the user a feeling of discomfort.

In this regard, according to the present embodiment, the drive start part 121 generates the second output in the motor 3 when the sliding door is located in the initial low speed section, and thus a proper movement speed of the sliding door during the initial motion can be achieved when closing the sliding door which is located in the initial low speed section. Specifically, when the sliding door is relatively close to the fully closed position, the movement speed of the sliding door during the initial motion can be made relatively small, and thus the possibility that the user feels that the movement speed of the sliding door is too fast can be reduced.

For example, in the characteristic 302 of FIG. 3, the maximum movement speed during the initial motion stays at a value $V_3$ slightly higher than the target value $V_0$ of the movement speed at this position. Thus, the sliding door stopped at a position where the door opening is narrow can be closed with initial motion at a relatively small speed.

In addition, according to the present embodiment, the drive start part 121 generates the first output in the motor 3 when the sliding door is located outside the initial low speed section, thus allowing the sliding door located outside the initial low speed section to be closed quickly.

Besides, according to the present embodiment, it is not necessary to prepare a plurality of types of target values (door speed maps) of the movement speed of the sliding door corresponding to the position of the sliding door. When a plurality of types of target values are prepared, the evaluation man-hour increases in proportion to the number of the door speed maps. However, according to the present embodiment, such problems can be eliminated.

Moreover, in the embodiment described above, the drive start part 121 generates the second output in the motor 3 only when the sliding door is located in the initial low speed section. However, the drive start part 121 may also generate the second output in the motor 3 when the sliding door is located in another section. Hereinafter, such an embodiment is referred to as a variation example.

That is, in one variation example, the drive start part 121 first generates the second output in the motor 3 regardless of the position of the sliding door. Then, when the sliding door does not move by the first predetermined amount or more even if the second output is generated in the motor 3, the drive start part 121 generates the first output in the motor 3 (see FIG. 4 below).

In another variation example, the drive start part 121 first generates the second output in the motor 3 regardless of the position of the sliding door. Then, when the sliding door does not move by the first predetermined amount or more even if the second output is generated in the motor 3, the drive start part 121 generates the third output in the motor 3. The third output is larger than the second output but smaller than the first output (see FIG. 5 below).

In still another variation example, the drive start part 121 first generates the second output in the motor 3 regardless of the position of the sliding door. Then, the drive start part 121 generates in the motor 3 the third output which is larger than the second output by a predetermined output when the sliding door does not move by the first predetermined amount or more even if the second output is generated in the motor 3. The third output is larger than the second output by a predetermined output but smaller than the first output. Then, when the third output is generated in the motor 3, the drive start part 121 gradually increases the third output toward the first output until the sliding door moves in the closing direction by the first predetermined amount or more. For example, the drive start part 121 increases the third output by a predetermined output every time a predetermined time (for example, 100 ms) elapses.

With the various variation examples above, the drive start part 121 generates the second output in the motor 3 when the sliding door is located in the initial low speed section, and thus a proper movement speed of the sliding door during the initial motion can be achieved when closing the sliding door which is located in the initial low speed section.

Besides, according to the various variation examples, by generating the second output being a relatively small output in the motor 3 in an early stage, the movement speed of the sliding door during the initial motion can be reduced, and when the sliding door does not initially move, the sliding door can be reliably started by generating the first output or the third output in the motor 3.

However, in various variation examples, the second output is generated in the motor 3 even when the sliding door is relatively far from the fully closed position, and thus a delay in the initial motion of the sliding door may be caused under the severe load condition. If the initial motion of the sliding door is delayed, the time until the sliding door is fully closed is longer than that in the above embodiment by the delayed time.

Next, an operation example of the opening/closing body control device 1 is described with reference to FIGS. 4 to 6.

Figure 4:
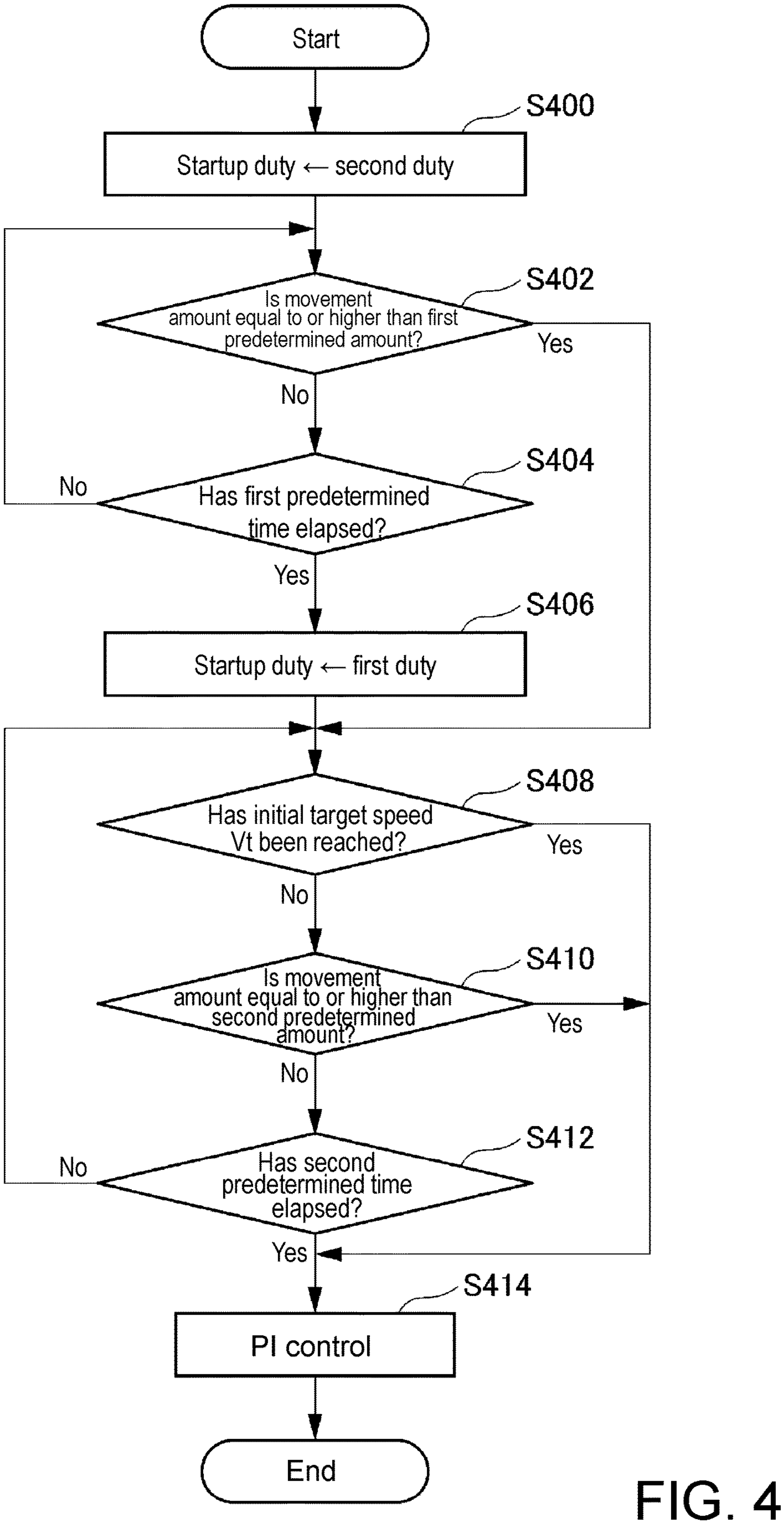
FIG. 4 is a flowchart showing an example of processing executed by a motor control part of the opening/closing body control device.

FIG. 4 is a flowchart showing an example of processing executed by the motor control part 12 of the opening/closing body control device 1.

The processing shown in FIG. 4 is started when the closing operation instruction is input from the operation switch 5 while the motor 3 is in the stopped state.

In step S400, the drive start part 121 operates the motor 3 so that the output of the motor 3 becomes the second output. Specifically, the drive start part 121 sets the startup duty to a second duty. The second duty has a value lower than a first duty described later.

In step S402, the drive start part 121 determines, based on the positional information from the positional information acquiring part 11, whether or not the sliding door has moved in the closing direction by the first predetermined amount or more. The first predetermined amount is optional, and may correspond to, for example, one pulse from the door position sensor 6. When it is determined that the sliding door has moved in the closing direction by the first predetermined amount or more, the drive start part 121 determines that the initial motion has been achieved, and the processing proceeds to step S408. On the other hand, when it is determined that the sliding door has not moved in the closing direction by the first predetermined amount or more, the processing proceeds to step S404.

In step S404, the drive start part 121 determines whether or not the drive state at the second duty has continued for the first predetermined time (for example, 100 ms) or more. If the determination result is "YES", the processing proceeds to step S406; otherwise, the processing returns to step S402. In this way, the drive state at the second duty is continued until the drive state at the second duty continues for the first predetermined time or more, or until the sliding door moves in the closing direction by the first predetermined amount or more.

In step S406, the drive start part 121 operates the motor 3 so that the output of the motor 3 becomes the first output. Specifically, the drive start part 121 sets the startup duty to the first duty. The first duty is a value higher than the second duty used in step S402. The first duty may be, for example, 30%.

In step S408, the drive start part 121 determines whether an initial target speed Vt has been reached or not. The initial target speed Vt may be a predetermined fixed value, for example, a target value of the movement speed of the sliding door associated with the fully open position. If the determination result is "YES", the processing proceeds to step S414; otherwise, the processing proceeds to step S410.

In step S410, the drive start part 121 determines, based on the positional information from the positional information acquisition part 11, whether or not the sliding door has moved in the closing direction by a second predetermined amount or more. The second predetermined amount is larger than the first predetermined amount and may correspond to, for example, 10 pulses from the door position sensor 6. If the determination result is "YES", the processing proceeds to step S414; otherwise, the processing proceeds to step S412.

In step S412, the drive start part 121 determines whether or not the drive state at the first duty has continued for a second predetermined time (for example, 350 ms) or more. If the determination result is "YES", the processing proceeds to step S414; otherwise, the processing returns to step S408. In this way, the drive state at the first duty is continued until the drive state at the first duty continues for the second predetermined time or more, or until the sliding door moves in the closing direction by the second predetermined amount or more.

In step S414, the drive part 122 executes the PI control based on the target value of the movement speed (stored in the door speed map part 15) and the positional information from the positional information acquisition part 11.

According to the processing shown in FIG. 4, the drive start part 121 generates the second output in the motor 3 when the sliding door is located in the initial low speed section which is close to the fully closed position, thus allowing the sliding door located in the initial low speed section to be closed with initial motion at a relatively low speed. In addition, by generating the first output in the motor 3 when the sliding door does not initially move at the second output generated in the motor 3, the sliding door can be reliably started.

Figure 5:
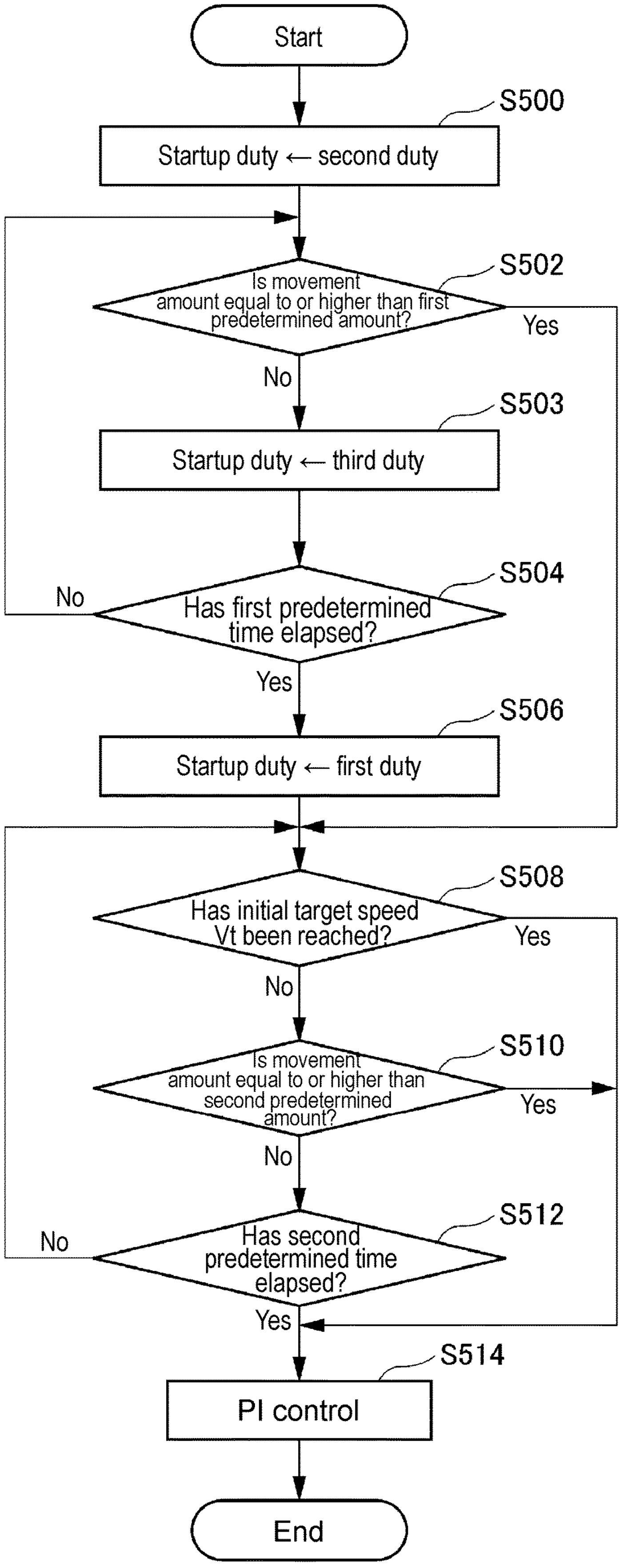
FIG. 5 is a flowchart showing another example of processing executed by the motor control part of the opening/closing body control device.

FIG. 5 is a flowchart showing another example of the processing executed by the motor control part 12 of the opening/closing body control device 1.

Step S500, step S502, and step S504 to step S514 may be the same as step S400, step S402, and step S404 to step S414 shown in FIG. 4, respectively, and thus description thereof is omitted or simplified.

The processing shown in FIG. 5 is started when the closing operation instruction is input from the operation switch 5 while the motor 3 is in the stopped state.

In step S502, if the determination result is "YES", the processing proceeds to step S508; otherwise, the processing proceeds to step S503.

In step S503, the drive start part 121 operates the motor 3 so that the output of the motor 3 becomes the third output. Specifically, the drive start part 121 sets the startup duty to a third duty. The third duty is a value lower than the first duty and higher than the second duty by a predetermined duty width. The predetermined duty width may be, for example, half the difference between the first duty and the second duty.

In step S504, the drive start part 121 determines whether or not the drive state at the third duty has continued for the first predetermined time (for example, 100 ms) or more. If the determination result is "YES", the processing proceeds to step S506; otherwise, the processing returns to step S502. In this way, the drive state at the third duty is continued until the drive state at the third duty continues for the first predetermined time or more, or until the sliding door moves in the closing direction by the first predetermined amount or more.

According to the processing shown in FIG. 5, the drive start part 121 generates the second output in the motor 3 when the sliding door is located in the initial low speed section which is close to the fully closed position, thus allowing the sliding door located in the initial low speed section to be closed with initial motion at a relatively low speed. In addition, when the sliding door does not initially move at the second output generated in the motor 3, the sliding door can be started, by generating the third output in the motor 3, at a lower movement speed than in the case in which the first output is generated in the motor 3. Furthermore, when the sliding door does not initially move at the third output generated in the motor 3, the sliding door can be reliably started by generating the first output in the motor 3.

Moreover, in FIG. 5, similar to FIG. 4, the drive state at the second duty may be continued until the drive state at the second duty continues for the first predetermined time or more, or until the sliding door moves in the closing direction by the first predetermined amount or more. In this case, when the drive state at the second duty continues for the first predetermined time or more without the sliding door moving in the closing direction by the first predetermined amount or more, the processing may proceed to step S503.

Besides, in FIG. 5, the third duty may be gradually increased by setting a small predetermined duty width. That is, the third duty may be gradually increased toward the first duty every first predetermined time until the sliding door moves in the closing direction by the first predetermined amount or more. Besides, if the sliding door does not move in the closing direction by the first predetermined amount or more even if the third duty has a value lower than the first duty by the predetermined duty width, the processing may proceed to step S506.

Figure 6:
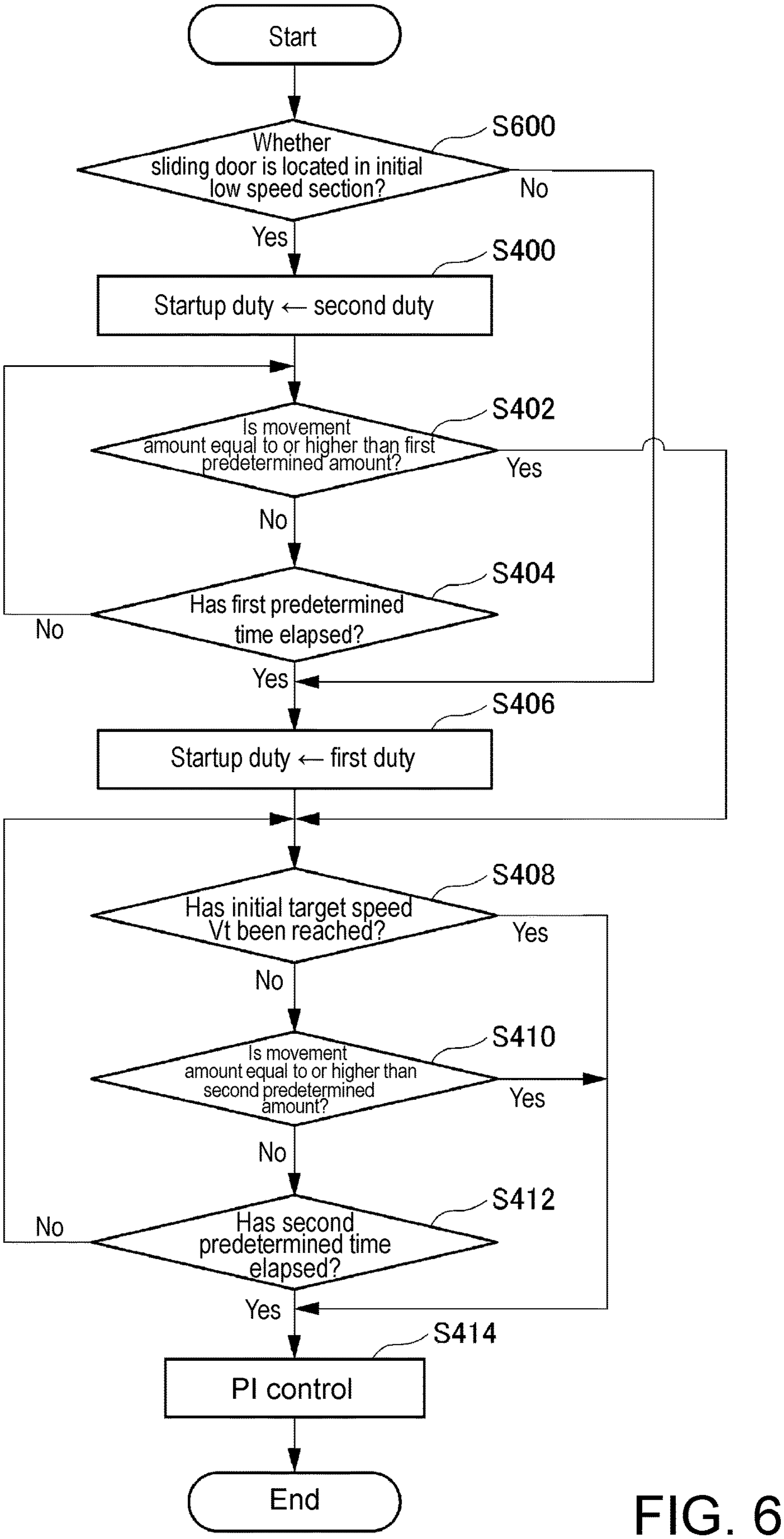
FIG. 6 is a flowchart showing still another example of processing executed by the motor control part of the opening/closing body control device.

FIG. 6 is a flowchart showing still another example of the processing executed by the motor control part 12 of the opening/closing body control device 1.

The processing shown in FIG. 6 is different from the processing shown in FIG. 4 in that step S600 is added. The following mainly describes the different parts.

The processing shown in FIG. 6 is started when the closing operation instruction is input from the operation switch 5 while the motor 3 is in the stopped state.

In step S600, the drive start part 121 determines whether the sliding door is in the initial low speed section or not. If the determination result is "YES", the processing proceeds to step S400; otherwise, the processing proceeds to step S406.

According to the processing shown in FIG. 6, the same effect as the processing shown in FIG. 4 can be obtained. The drive start part 121 generates the second output in the motor 3 only when the sliding door is located in the initial low speed section which is close to the fully closed position. That is, the drive start part 121 generates the first output in the motor 3 when the sliding door is located outside the initial low speed section which is close to the fully closed position. Accordingly, the first output is generated in the motor 3 when the sliding door is relatively far from the fully closed position, thus enabling the closing operation of the sliding door to be completed quickly.

Figure 7:
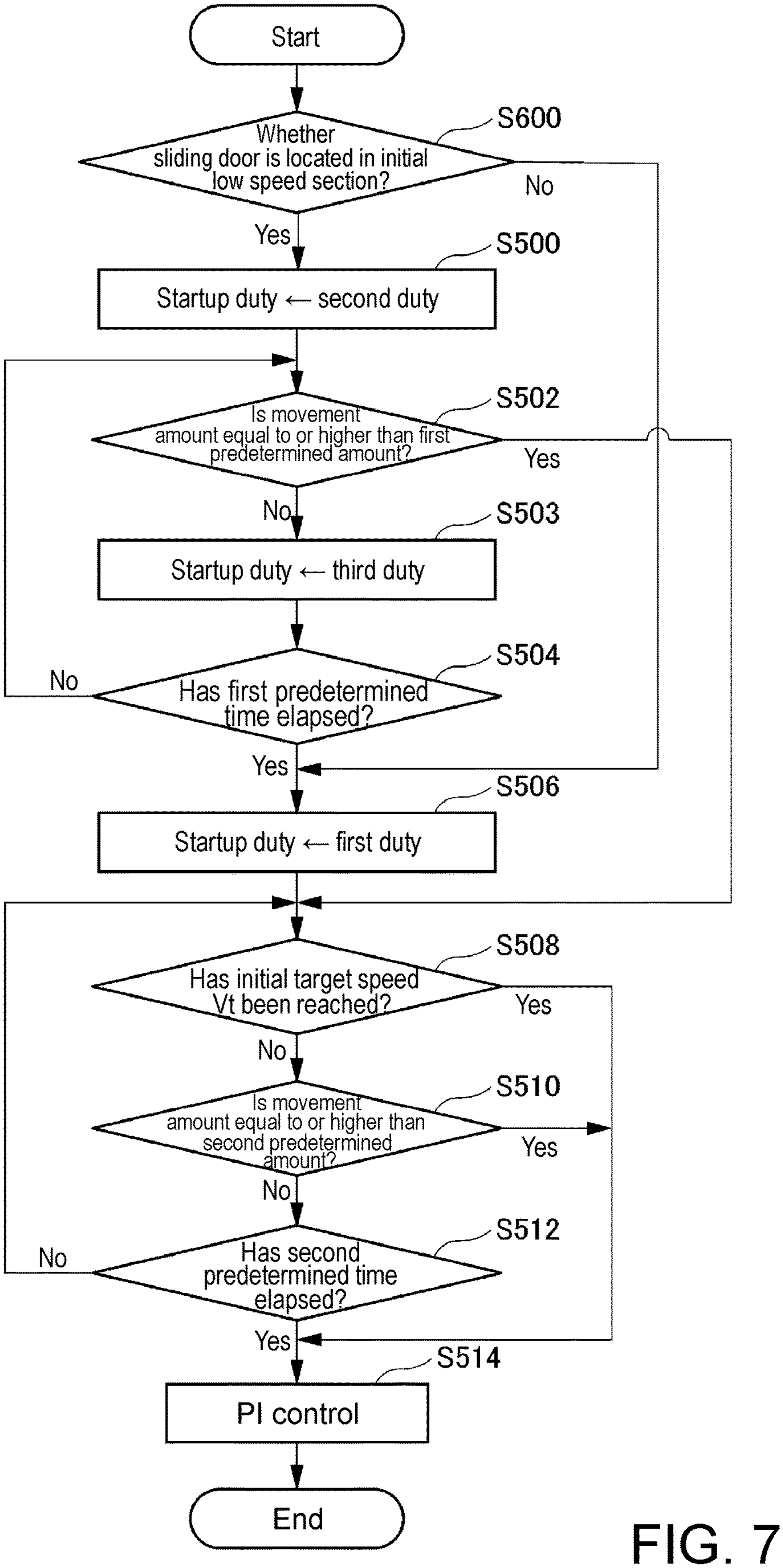
FIG. 7 is a flowchart showing yet another example of processing executed by the motor control part of the opening/closing body control device.

FIG. 7 is a flowchart showing yet another example of the processing executed by the motor control part 12 of the opening/closing body control device 1.

The processing shown in FIG. 7 is different from the processing shown in FIG. 5 in that step S600 is added. The following mainly describes the different parts.

In step S600, the drive start part 121 determines whether the sliding door is located in the initial low speed section or not. If the determination result is "YES", the processing proceeds to step S500; otherwise, the processing proceeds to step S506.

According to the processing shown in FIG. 7, the same effect as the processing shown in FIG. 5 can be obtained. The drive start part 121 generates the second output in the motor 3 only when the sliding door is located in the initial low speed section which is close to the fully closed position. That is, the drive start part 121 generates the first output in the motor 3 when the sliding door is located outside the initial low speed section which is close to the fully closed position. Accordingly, the first output is generated in the motor 3 when the sliding door is relatively far from the fully closed position, thus enabling the sliding door to be started reliably under the severe load condition.

Second Embodiment

Next, examples of the second embodiment are described with reference to FIGS. 8 to 10. In the first embodiment (FIGS. 1 to 7), the drive start part 121 generates a plurality of different outputs in the motor 3, thereby achieving a proper movement speed of the sliding door during the initial motion of the sliding door. In contrast, in each of the following embodiments, the feedback gain used in the feedback control by the drive part 122 is changed according to the position of the sliding door at the start of the closing operation, thereby achieving a proper movement speed during the feedback control.

As described above, the drive part 122 performs feedback control of the motor 3 based on the positional information of the sliding door so that the speed of the sliding door which has been started to move by the drive start part 121 reaches the target value. The target value of the movement speed is defined by the relationship with the position of the sliding door. The relationship is stored in the door speed map part 15, and is represented as, for example, the characteristic 200 as shown in FIG. 2. The drive part 122 feedback-controls the motor 3 by, for example, the PI control or the PID control, based on the target value of the movement speed stored in the door speed map part 15 and the positional information of the sliding door.

In general, feedback control including the PI control or the PID control is ideal if the control target value can always match the target value. However, practically, the control target value cannot be completely matched with the target value due to the transient response of the control system. In particular, when controlling the speed of the sliding door, the load applied to the sliding door increases due to the inclination of the vehicle, the environmental temperature, or the like, and thus it is necessary to set the feedback gain being a specified value, for example, the feedback gain of the proportional element or the integral element to a higher value, which tends to cause a change in transitional speed.

Consequently, when the closing operation of the sliding door is started from a position relatively close to the fully closed position, and the feedback gain remains the default value, for example, the value used when the closing operation is started from the fully open position, the speed of the sliding door may be excessively high. That is, when the feedback control by the drive part 122 is performed after the sliding door is started to move by the drive start part 121, the feedback amount, especially the feedback amount of the proportional element or the integral element is excessively large, and a speed greatly exceeding the target value may be generated transiently.

In each of the following embodiments, an example is shown in which a proper movement speed during feedback control is achieved by changing the feedback gain according to the stop position of the sliding door at which the closing operation is started.

Figure 8:
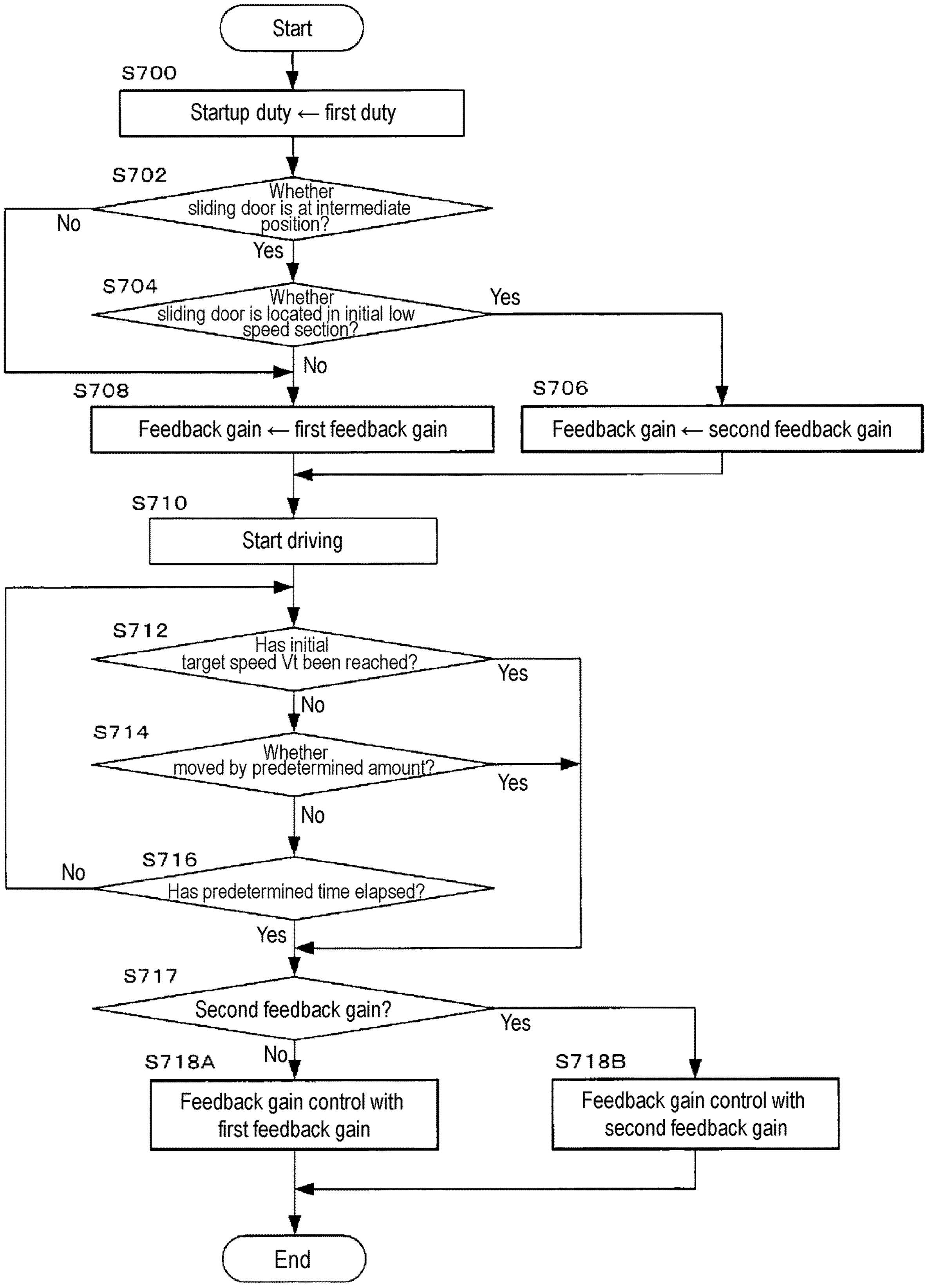
FIG. 8 is a flowchart showing an example of processing executed by the motor control part of the opening/closing body control device.

FIG. 8 is a flowchart showing an example of processing executed by the motor control part 12 of the opening/closing body control device 1.

The processing shown in FIG. 8 is started when the closing operation instruction is input from the operation switch 5 while the motor 3 is in the stopped state.

In step S700 of FIG. 8, the drive start part 121 sets the startup duty to the first duty.

In step S702, the drive start part 121 determines whether the sliding door is at the intermediate position or not based on the positional information from the positional information acquisition part 11. When it is determined that the sliding door is in the fully closed position or the fully open position, the processing proceeds to step S708, and when it is determined that the sliding door is not in the fully closed position or the fully open position (that is, it is determined that the sliding door is at the intermediate position), the processing proceeds to step S704.

In step S704, the drive start part 121 determines whether the sliding door is located in the initial low speed section or not based on the positional information from the positional information acquisition part 11. If the determination result is "YES", the processing proceeds to step S706; otherwise, the processing proceeds to step S708.

In step S708, the drive part 122 sets the feedback gain to a first feedback gain. This feedback gain is used in the feedback control in step S718A described later.

In step S706, the drive part 122 sets the feedback gain to a second feedback gain. This feedback gain is used in the feedback control in step S718B described later. The second feedback gain is set to a value smaller than the first feedback gain.

In step S710, the drive start part 121 starts the operation of the motor 3 at the first duty set in step S700. Accordingly, the driving of the sliding door is started.

In step S712, the drive start part 121 determines whether the speed of the sliding door has reached the initial target speed Vt or not. The initial target speed Vt may be a predetermined fixed value, for example, a target value of the movement speed of the sliding door associated with the fully open position. If the determination result is "YES", the processing proceeds to step S717; otherwise, the processing proceeds to step S714.

In step S714, the drive start part 121 determines whether or not the sliding door has moved in the closing direction by the second predetermined amount or more based on the positional information from the positional information acquisition part 11. The predetermined amount may correspond to, for example, 10 pulses from the door position sensor 6. If the determination result is "YES", the processing proceeds to step S717; otherwise, the processing proceeds to step S716.

In step S716, the drive start part 121 determines whether or not the drive state at the first duty has continued for a predetermined time or more. If the determination result is "YES", the processing proceeds to step S717; otherwise, the processing returns to step S712. In this way, when the speed of the sliding door does not reach the initial target speed Vt, the drive state at the first duty is continued until the drive state at the first duty continues for the predetermined time or more, or until the sliding door moves in the closing direction by the predetermined amount or more.

In step S717, it is determined whether the feedback gain is set to the second feedback gain. If the feedback gain is set to the second feedback gain, the processing proceeds to step S718B. Otherwise, that is, if the feedback gain is set to the first feedback gain, the processing proceeds to step S718A.

In step S718A, the drive part 122 executes the feedback control by using the first feedback gain. The drive part 122 continues the feedback control until it is determined that the sliding door has reached the fully closed position or the fully open position based on the positional information from the positional information acquisition part 11.

In step S718B, the drive part 122 executes the feedback control by using the second feedback gain. The drive part 122 continues the feedback control until it is determined that the sliding door has reached the fully closed position or the fully open position based on the positional information from the positional information acquisition part 11.

In the processing shown in FIG. 8, when the sliding door is located in the initial low speed section at the start of the closing operation, the feedback control is executed by using the second feedback gain which has a smaller value instead of the first feedback gain being the default value. Thus, this can prevent the speed of the sliding door from greatly exceeding the target value shown as the characteristic 200 in FIG. 2 after the driving by the drive start part 121 during the initial motion is completed and the feedback control is performed by the drive part 122. In particular, when only a speed that is lower than the initial target speed Vt is obtained by the driving by the drive start part 121, the speed of the sliding door when transitioning to the feedback control may also be significantly lower than the target value shown as the characteristic 200. However, even in this case, the transient speed increase after the transition to the feedback control can be suppressed by reducing the feedback gain.

In the present embodiment, either the PI control or the PID control can be used as the feedback control executed in step S718A and step S718B. In addition, the first feedback gain and the second feedback gain can be either the feedback gain of the proportional element or the feedback gain of the integral element. Furthermore, the feedback gain of the proportional element and the feedback gain of the integral element may be changed at the same time. For example, the values of the feedback gain of the proportional element and the feedback gain of the integral element used in the feedback control in step S718B may be smaller than the values of the feedback gain of the proportional element and the feedback gain of the integral element used in the feedback control in step S718A, respectively.

Figure 9:
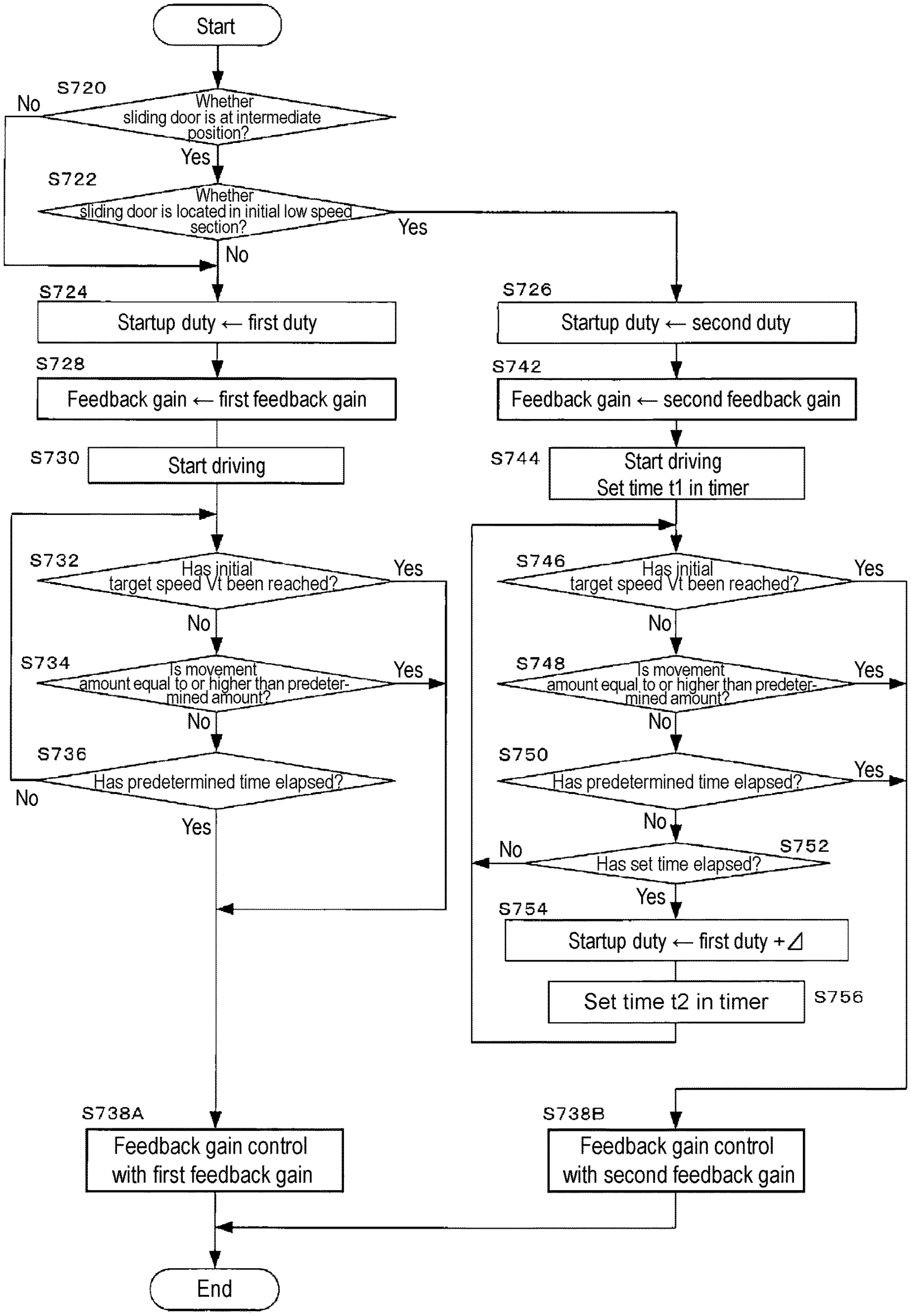
FIG. 9 is a flowchart showing another example of processing executed by the motor control part of the opening/closing body control device.

FIG. 9 is a flowchart showing another example of processing executed by the motor control part 12 of the opening/closing body control device 1. In the processing shown in FIG. 9, the output of the motor 3 during the initial motion is switched as shown in the first embodiment simultaneously with switching of the feedback gain.

The processing shown in FIG. 9 is started when the closing operation instruction is input from the operation switch 5 while the motor 3 is in the stopped state.

In step S720 of FIG. 9, the drive start part 121 determines whether the sliding door is at the intermediate position or not based on the positional information from the positional information acquisition part 11. If it is determined that the sliding door is in the fully closed position or the fully open position, the processing proceeds to step S724, and if it is determined that the sliding door is not in the fully closed position or the fully open position, the processing proceeds to step S722.

In step S722, the drive start part 121 determines whether the sliding door is located in the initial low speed section or not based on the positional information from the positional information acquisition part 11. If the determination result is "YES", the processing proceeds to step S726; otherwise, the processing proceeds to step S724.

In step S724, the drive start part 121 sets the startup duty to the first duty.

In step S728, the drive part 122 sets the feedback gain to the first feedback gain. The feedback gain is used in feedback control in step S738A described later.

In step S730, the drive start part 121 starts the operation of the motor 3 at the first duty set in step S724. Accordingly, the driving of the sliding door is started.

In step S732, the drive start part 121 determines whether the speed of the sliding door has reached the initial target speed Vt or not. The initial target speed Vt may be a predetermined fixed value, for example, a target value of the movement speed of the sliding door associated with the fully open position. If the determination result is "YES", the processing proceeds to step S738A; otherwise, the processing proceeds to step S734.

In step S734, the drive start part 121 determines, based on the positional information from the positional information acquisition part 11, whether or not the sliding door has moved in the closing direction by a predetermined amount or more. The predetermined amount may correspond to, for example, 10 pulses from the door position sensor 6. If the determination result is "YES", the processing proceeds to step S738A; otherwise, the processing proceeds to step S736.

In step S736, the drive start part 121 determines whether or not the drive state at the first duty has continued for a predetermined time or more. If the determination result is "YES", the processing proceeds to step S738A; otherwise, the processing returns to step S732. In this way, when the sliding door does not reach the initial target speed Vt, the drive state at the first duty is continued until the drive state at the first duty continues for the predetermined time or more, or until the sliding door moves in the closing direction by the predetermined amount or more.

In step S738A, the drive part 122 executes the feedback control by using the second feedback gain. The drive part 122 continues the feedback control until it is determined that the sliding door has reached the fully closed position or the fully open position based on the positional information from the positional information acquisition part 11.

On the other hand, in step S726, the drive start part 121 sets the startup duty to the second duty. The second duty has a value smaller than the first duty.

In step S742, the drive part 122 sets the feedback gain to the second feedback gain. The feedback gain is used in the feedback control in step S738B described later. The second feedback gain has a value smaller than the first feedback gain.

In step S744, the drive start part 121 starts the operation of the motor 3 at the second duty set in step S726. Accordingly, the driving of the sliding door is started. In addition, the drive start part 121 sets a time t1 in the timer for controlling the value of the startup duty, and starts the time counting by the timer. The timer counts down the remaining time from the time t1.

In step S746, the drive start part 121 determines whether the speed of the sliding door has reached the initial target speed Vt or not. If the determination result is "YES", the processing proceeds to step S738B; otherwise, the processing proceeds to step S748.

In step S748, the drive start part 121 determines whether or not the sliding door has moved in the closing direction by the predetermined amount or more based on the positional information from the positional information acquisition part 11. If the determination result is "YES", the processing proceeds to step S738B; otherwise, the processing proceeds to step S750.

In step S750, the drive start part 121 determines whether or not the drive state at the first duty has continued for the predetermined time or more. If the determination result is "YES", the processing proceeds to step S738B; otherwise, the processing proceeds to step S752.

In step S752, the drive start part 121 determines whether the remaining time of the timer is zero. If the determination result is "YES", the processing proceeds to step S754; otherwise, the processing returns to step S746.

In step S754, the drive start part 121 updates the startup duty by adding a predetermined value Δ to the current startup duty.

In step S756, the drive start part 121 sets a time t2 in the timer for controlling the value of the startup duty, starts time counting by the timer, and returns to step S746. The timer counts down the remaining time from the time t2.

Thus, when the sliding door does not reach the initial target speed Vt, the drive start part 121 continues the drive state until the drive state of the sliding door continues for the predetermined time or more, or until the sliding door moves in the closing direction by the predetermined amount or more.

Besides, while the sliding door is being driven, the startup duty is updated every time the remaining time of the timer becomes zero, and the value of the startup duty increases by the predetermined value Δ.

Figure 10:
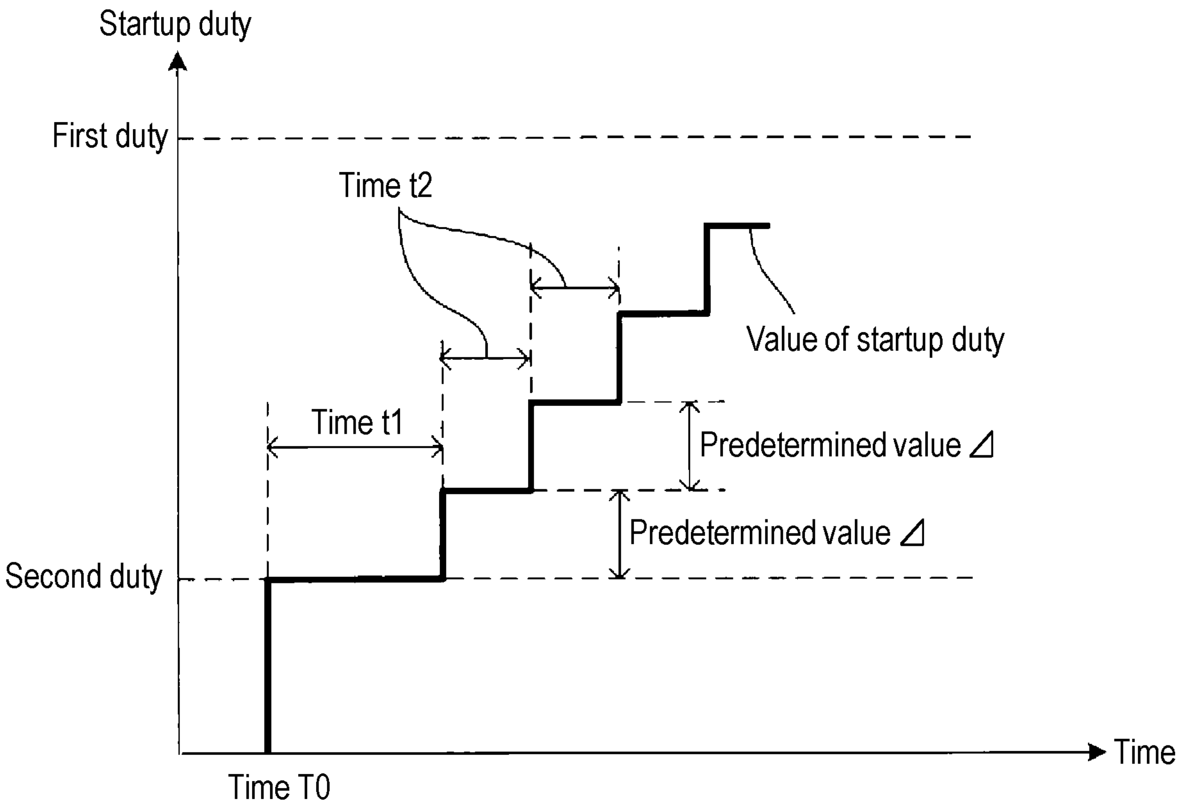
FIG. 10 is a diagram showing an updated state of a startup duty.

FIG. 10 is a diagram showing an updated state of the startup duty. As shown in FIG. 10, while the sliding door is continuously driven, the value of the startup duty increases from the value of the second startup duty by the predetermined value Δ when the time t1 has elapsed from a time T0 when the sliding door starts to be driven. Furthermore, the value of the startup duty increases by the predetermined value Δ each time the time t2 elapses. Accordingly, even if the sliding door is not moved by the driving at the second startup duty, the sliding door starts to move as the value of the startup duty increases. Alternatively, by increasing the value of the startup duty, the movement speed of a certain degree can be obtained by the driving with the driving start part 121.

Next, in step S738B, the drive part 122 executes the feedback control by using the second feedback gain. The drive part 122 continues the feedback control until it is determined that the sliding door has reached the fully closed position or the fully open position based on the positional information from the positional information acquisition part 11.

In the processing shown in FIG. 9, similar to the processing shown in FIG. 8, when the sliding door is located in the initial low speed section at the start of the closing operation, the feedback control is executed by using the second feedback gain which has a smaller value instead of the first feedback gain being the default value. Thus, this can prevent the speed of the sliding door from greatly exceeding the target value shown as the characteristic 200 in FIG. 2 after the driving by the drive start part 121 is completed and the feedback control is performed by the drive part 122.

In addition, in the present embodiment, when the startup duty is set to the second startup duty, the value of the startup duty gradually increases and the output of the motor 3 gradually increases while the sliding door is continuously driven. Consequently, a situation in which the sliding door does not move and remains stopped can be avoided. Besides, by driving the sliding door at the speed of a certain degree at the time of transitioning to the feedback control, the difference between the speed of the sliding door at the time of transitioning to the feedback control and the target value of the sliding door is reduced. As a result, in combination with the use of the second feedback gain having a small value, an increase in the transient speed after the transition to the feedback control is suppressed. Therefore, the fluctuation of the speed that greatly exceeds the target value shown as the characteristic 200 can be reliably suppressed.

Also in the present embodiment, either the PI control or the PID control can be executed as the feedback control executed in step S718A and step S718B. In addition, the first feedback gain and the second feedback gain can be either the feedback gain of the proportional element or the feedback gain of the integral element. Furthermore, the feedback gain of the proportional element and the feedback gain of the integral element may be changed at the same time. For example, the values of the feedback gain of the proportional element and the feedback gain of the integral element used in the feedback control of step S718B may be smaller than the values of the feedback gain of the proportional element and the feedback gain of the integral element used in the feedback control of step S718A, respectively.

In the processing shown in FIG. 9, both the startup duty and the feedback gain are set to small values (the second startup duty and the second feedback gain) under the common condition that the sliding door is located in the initial low speed section at the start of the initial motion. However, the condition for selecting the second feedback gain may be different from the condition for selecting the second startup duty. For example, the feedback gain may be set to the second feedback gain under the condition that the sliding door is located in a section in which the range is expanded to the fully open side from the initial low speed section at the start of the initial motion.

The embodiment shown in FIG. 8 or FIG. 9 can also be combined with the embodiments shown in FIGS. 1 to 8. That is, the feedback gain used in the PI control in each embodiment can be switched according to the position of the sliding door during the initial motion of the sliding door. In this case, the condition for selecting the feedback gain may also be the same as or different from the condition for selecting the startup duty.

Although the embodiments have been described in detail above, the present invention is not limited to the specific embodiments, and various modifications and changes can be made within the scope of the claims. In addition, it is possible to combine all or a plurality of the constituent elements of the above embodiments.

Moreover, the following appendixes are disclosed concerning the above embodiments.

APPENDIX 1

A vehicular opening/closing body control device, including:

- a positional information acquisition part for acquiring positional information about an opening/closing body of a vehicle;
- a storage part for storing a target value of a movement speed of the opening/closing body corresponding to a position of the opening/closing body; and
- a motor control part for controlling a motor opening/closing the opening/closing body, wherein the motor control part includes:

- a drive start part configured to operate the motor based on the positional information acquired by the positional information acquisition part so that the opening/closing body in a stopped state is moved; and
- a drive part configured to perform feedback control of the motor based on the positional information acquired by the positional information acquisition part and the target value stored in the storage part so that the movement speed of the opening/closing body which has been started to move by the drive start part reaches the target value, the drive start part generates a first output in the motor when the position of the opening/closing body at the stopped state acquired by the positional information acquisition part is a first position, and generates a second output smaller than the first output in the motor when the position of the opening/closing body at the stopped state acquired by the positional information acquisition part is a second position closer to the fully closed position than the first position.

According to the configuration of appendix 1, when the opening/closing body is in the second position closer to the fully closed position than the first position, the drive start part generates the second output which is smaller than the first output in the motor, and thus during closing operation of the opening/closing body which is at the second position between the fully open position and the fully closed position, the movement speed of the opening/closing body during the initial motion of the opening/closing body can be reduced to a relatively low speed.

APPENDIX 2

The vehicular opening/closing body control device according to appendix 1, wherein the second position is closer to the fully closed position than an intermediate position between the fully open position and the fully closed position.

Here, if the movement speed of the opening/closing body during the initial motion of the opening/closing body is relatively fast at a position closer to the fully closed position than the intermediate position between the fully open position and the fully closed position, the user is likely to feel uncomfortable (a feeling of discomfort when the speed is too high). In this regard, according to the configuration of appendix 2, by achieving a proper movement speed during the initial motion from the second position which is closer to the fully closed position than the intermediate position between the fully open position and the fully closed position, the possibility of giving the feeling of discomfort as described above can be reduced.

APPENDIX 3

The vehicular opening/closing body control device according to appendix 2, wherein the second position refers to each position in a section from the fully closed position to a predetermined distance in the opening direction.

According to the configuration of appendix 3, a proper movement speed of the opening/closing body during the initial motion from each position within the section from the fully closed position to the predetermined distance in the opening direction can be achieved.

APPENDIX 4

The vehicular opening/closing body control device according to appendix 2, wherein the target value corresponding to the position of the opening/closing body increases as the opening/closing body moves from the fully open position toward a third position in a closing direction, and is constant as the opening/closing body moves from the third position to a fourth position in the closing direction; the target value decreases as the opening/closing body moves from the fourth position toward a fifth position in the closing direction, and is constant as the opening/closing body moves from the fifth position to the fully closed position in the closing direction, the second position refers to each position in a section from the fifth position to the fully closed position in the closing direction.

According to the configuration of appendix 4, a proper movement speed of the opening/closing body during the initial motion from any position in this section can be achieved in accordance with the section in which the target value corresponding to the position of the opening/closing body is relatively low.

APPENDIX 5

The vehicular opening/closing body control device according to any one of appendixes 1 to 4, wherein when the second output is generated in the motor and the opening/closing body does not move in a closing direction by the predetermined amount or more, the drive start part generates a third output which is greater than the second output and less than or equal to the first output in the motor.

According to the configuration of appendix 5, a proper movement speed of the opening/closing body during the initial motion can be achieved, and the opening/closing body can be reliably started by increasing the output when the opening/closing body is not moved by the first predetermined amount or more at the second output.

APPENDIX 6

The vehicular opening/closing body control device according to any one of appendixes 1 to 4, wherein when a third output, which is greater than the second output and less than or equal to the first output, is generated in the motor when the second output is generated in the motor and the opening/closing body does not move in a closing direction by a first predetermined amount or more, the drive start part gradually increases the third output toward the first output until the opening/closing body moves in the closing direction by the first predetermined amount or more.

According to the configuration of appendix 6, when the opening/closing body is not moved by the first predetermined amount or more at the second output, by gradually increasing the output, the movement speed during the initial motion can be reduced and the opening/closing body can be reliably started.

APPENDIX 7

The vehicular opening/closing body control device according to any one of appendixes 1 to 6, wherein when the opening/closing body moves in a closing direction by a second predetermined amount or more, or when the movement speed of the opening/closing body reaches a predetermined initial target value, or when a predetermined time has elapsed from a time when the drive start part generates the first output in the motor, the drive part starts the feedback control.

According to the configuration of appendix 7, when the opening/closing body moves in the closing direction by the second predetermined amount or more, the feedback control can be performed.

APPENDIX 8

A vehicular opening/closing body control device, including:

a positional information acquisition part for acquiring positional information about an opening/closing body of a vehicle;

a storage part for storing a target value of a movement speed of the opening/closing body corresponding to a position of the opening/closing body; and a motor control part for controlling a motor opening/closing the opening/closing body, wherein the motor control part includes:

a drive start part configured to operate the motor based on the positional information acquired by the positional information acquisition part so that the opening/closing body in a stopped state is moved; and a drive part configured to perform feedback control of the motor based on the positional information acquired by the positional information acquisition part and the target value stored in the storage part so that the movement speed of the opening/closing body which has been started to move by the drive start part reaches the target value, the drive start part first generates a second output which is smaller than a first output in the motor regardless of the position of the opening/closing body in the stopped state acquired by the positional information acquisition part, and when the opening/closing body does not move in a closing direction by a first predetermined amount or more when the second output is generated in the motor, the first output or a third output which is greater than the second output but less than or equal to the first output is generated in the motor.

According to the configuration of appendix 8, a proper movement speed of the opening/closing body during the initial motion can be achieved, and the possibility of the initial motion of the opening/closing body can be enhanced by increasing the output to the first output or the third output when the opening/closing body is not moved by the first predetermined amount or more at the second output.

APPENDIX 9

A vehicular opening/closing body control device, including:

a positional information acquisition part for acquiring positional information about an opening/closing body of a vehicle;

a storage part for storing a target value of a movement speed of the opening/closing body corresponding to a position of the opening/closing body; and a motor control part for controlling a motor opening/closing the opening/closing body, wherein the motor control part includes:

a drive start part configured to control the output of the motor based on the positional information acquired by the positional information acquisition part so that the opening/closing body in a stopped state is moved; and a drive part configured to perform feedback control of the motor based on the positional information and the target value stored in the storage part so that the movement speed of the opening/closing body which has been started to move by the drive start part reaches the target value, when the position of the opening/closing body in the stopped state obtained by the positional information acquisition part is a first position, the drive part performs feedback control of the motor by using a first feedback gain, and when the position of the opening/closing body in the stopped state obtained by the positional information acquisition part is a second position closer to a fully closed position than the first position, the drive part performs feedback control of the motor by using a second feedback gain having a smaller value than the first feedback gain.

According to the configuration of appendix 9, the drive part performs feedback control of the motor by using the second feedback gain which has a smaller value than the first feedback gain when the opening/closing body is at the second position closer to the fully closed position than the first position, and thus during the closing operation of the opening/closing body which is at the second position between the fully open position and the fully closed position, the movement speed of the opening/closing body can be reduced to a relatively low speed.

APPENDIX 10

The vehicular opening/closing body control device according to appendix 9, wherein the feedback gain is a feedback gain of a proportional element.

According to the configuration of appendix 10, when the opening/closing body is at the second position closer to the fully closed position than the first position, the drive part performs feedback control of the motor by using the feedback gain of the proportional element being the second feedback gain which has a smaller value than the feedback gain of the proportional element being the first feedback gain, and thus during the closing operation of the opening/closing body which is at the second position between the fully open position and the fully closed position, the movement speed of the opening/closing body can be reduced to a relatively low speed.

APPENDIX 11

The vehicular opening/closing body control device according to appendix 9 or 10, wherein the feedback gain is a feedback gain of an integral element.

According to the configuration of appendix 11, when the opening/closing body is at the second position closer to the fully closed position than the first position, the drive part performs feedback control of the motor by using the feedback gain of the integral element being the second feedback gain which has a smaller value than the feedback gain of the integral element being the first feedback gain, and thus during the closing operation of the opening/closing body which is at the second position between the fully open position and the fully closed position, the movement speed of the opening/closing body can be reduced to a relatively low speed.

APPENDIX 12

The vehicular opening/closing body control device according to any one of appendixes 9 to 11, wherein the second position is closer to the fully closed position than an intermediate position between the fully open position and a fully closed position.

Here, if the movement speed of the opening/closing body is relatively fast at a position closer to the fully closed position than the intermediate position between the fully open position and the fully closed position, the user is likely to feel uncomfortable (a feeling of discomfort when the speed is too high). In this regard, according to the configuration of appendix 2, by achieving a proper movement speed during the initial motion from the second position which is closer to the fully closed position than the intermediate position between the fully open position and the fully closed position, the possibility of giving the feeling of discomfort as described above can be reduced.

APPENDIX 13

The vehicular opening/closing body control device according to appendix 12, wherein the second position refers to each position in a section from the fully closed position to a predetermined distance in an opening direction.

According to the configuration of appendix 13, a proper movement speed of the opening/closing body from any position in the section from the fully closed position to the predetermined distance in the opening direction can be achieved.

APPENDIX 14

The vehicular opening/closing body control device according to appendix 12, wherein the target value corresponding to the position of the opening/closing body increases as the opening/closing body moves from the fully open position toward a third position in a closing direction, and is constant as the opening/closing body moves from the third position to a fourth position in the closing direction; the target value decreases as the opening/closing body moves from the fourth position toward a fifth position in the closing direction, and is constant as the opening/closing body moves from the fifth position to the fully closed position in the closing direction, the second position refers to each position in a section from the fifth position to the fully closed position in the closing direction.

According to the configuration of appendix 14, a proper movement speed of the opening/closing body from any position in this section can be achieved in accordance with the section in which the target value corresponding to the position of the opening/closing body is relatively low.

APPENDIX 15

The vehicular opening/closing body control device according to any one of appendixes 11 to 14, wherein the drive start part gradually increases the output when the output is generated in the motor and the opening/closing body does not move in a closing direction by a predetermined amount or more.

According to the configuration of appendix 15, when the opening/closing body is not moved by the predetermined amount or more at the second output, by gradually increasing the output, the movement speed during the initial motion can be reduced and the opening/closing body can be reliably started.

APPENDIX 16

The vehicular opening/closing body control device according to any one of appendixes 11 to 15, wherein when the opening/closing body moves in a closing direction by a predetermined amount or more, or when the movement speed of the opening/closing body reaches a predetermined initial target value, or when a predetermined time has elapsed from a time when the drive start part generates the output in the motor, the drive part starts the feedback control.

According to the configuration of appendix 16, when the opening/closing body moves in the closing direction by the predetermined amount or more, the feedback control can be performed.

What is claimed is:

1. A vehicular opening/closing body control device, comprising:

a processor, configured to acquire positional information about an opening/closing body of a vehicle, control a motor that opens/closes the opening/closing body, and switch on/off a driver by pulse width modulation control to apply a voltage to the motor via the driver, wherein a duty for driving the motor determines ON time of the driver, a higher duty value corresponds to a higher output of the motor; and a memory, configured to store a target value of a movement speed of the opening/closing body corresponding to a position of the opening/closing body, wherein the processor is further configured to:

operate the motor based on the acquired positional information so that the opening/closing body in a stopped state is moved; and perform feedback control of the motor based on the acquired positional information and the target value stored in the memory so that the movement speed of the opening/closing body which has been started to move by the processor reaches the target value, the processor sets a startup duty for driving the motor to a first duty value when the position of the opening/closing body at the stopped state acquired by the processor is a first position, and sets the startup duty for driving the motor to a second duty value lower than the first duty value when the position of the opening/closing body at the stopped state acquired by the processor is a second position closer to a fully closed position of the opening/closing body than the first position, where the first position is a fully open position of the opening/closing body, the second position refers to each position in an initial low speed section, the target value is constant as the opening/closing body moves in the initial low speed section, wherein when the motor is driven with the startup duty set to the second duty value and the opening/closing body does not move in a closing direction by a first predetermined amount or more, the processor sets the startup duty for driving the motor to a third duty value which is lower than the first duty value and higher than the second duty value by a predetermined duty width, when the motor driven with the startup duty set to the third duty value has continued for a predetermined time or more and the opening/closing body does not move in the closing direction by the first predetermined amount or more, the processor gradually adjusts the startup duty for driving the motor to be the first duty value from the third duty value, wherein when the motor is driven with the third duty value and the opening/closing body does not move in the closing direction by the first predetermined amount or more, the processor gradually increases the startup duty from the third duty value toward the first duty value by adding a predetermined incremental value every time a remaining time of a timer set by the processor becomes zero until the opening/closing body moves in the closing direction by the first predetermined amount or more.

2. The vehicular opening/closing body control device according to claim 1, wherein the second position is closer to the fully closed position than an intermediate position between the fully open position and the fully closed position.

3. The vehicular opening/closing body control device according to claim 2, wherein the second position refers to each position in a range from the fully closed position to a predetermined distance in an opening direction.

4. The vehicular opening/closing body control device according to claim 2, wherein the target value corresponding to the position of the opening/closing body increases as the opening/closing body moves from the fully open position toward a third position in the closing direction, and is constant as the opening/closing body moves from the third position to a fourth position in the closing direction; the target value decreases as the opening/closing body moves from the fourth position toward a fifth position in the closing direction, and is constant as the opening/closing body moves from the fifth position to the fully closed position in the closing direction, the initial low speed section is from the fifth position to the fully closed position in the closing direction.

5. The vehicular opening/closing body control device according to claim 1, wherein when the opening/closing body moves in the closing direction by a second predetermined amount or more, or when the movement speed of the opening/closing body reaches a predetermined initial target value, or when a predetermined time has elapsed from a time when the processor drives the motor with the first duty value, the processor starts the feedback control.

6. A vehicular opening/closing body control device, comprising:

a processor, configured to acquire positional information about an opening/closing body of a vehicle, control a motor that opens/closes the opening/closing body, and switch on/off a driver by pulse width modulation control to apply a voltage to the motor via the driver, wherein a duty for driving the motor determines ON time of the driver, a higher duty value corresponds to a higher output of the motor; and a memory, configured to store a target value of a movement speed of the opening/closing body corresponding to a position of the opening/closing body, wherein the processor is further configured to:

control the output of the motor based on the acquired positional information so that the opening/closing body in a stopped state is moved; and perform feedback control of the motor based on the positional information and the target value stored in the memory so that the movement speed of the opening/closing body which has been started to move by the processor reaches the target value, when the position of the opening/closing body in the stopped state obtained by the processor is a first position, the processor drives the motor with a first duty value and performs feedback control of the motor by using a first feedback gain, and when the position of the opening/closing body in the stopped state obtained by the processor is a second position closer to a fully closed position than the first position, the processor drives the motor with a second duty value lower than the first duty value and performs feedback control of the motor by using a second feedback gain having a smaller value than the first feedback gain, wherein the second position refers to each position in an initial low speed section, the target value is constant as the opening/closing body moves in the initial low speed section, only in a state that the processor drives the motor with the second duty value, while the opening/closing body is being driven, time counting is started by a timer set by the processor, wherein a parameter representing a startup duty is updated by adding a predetermined incremental value thereto every time a remaining time of the timer becomes zero, and a value of the startup duty thereby increases by the predetermined incremental value, wherein the timer is set with a first time period before starting the time counting, and the timer is reset with a second time period after each said update of the startup duty, the second time period is shorter than the first time period.

7. The vehicular opening/closing body control device according to claim 6, wherein the feedback gain is a feedback gain of a proportional element.

8. The vehicular opening/closing body control device according to claim 6, wherein the feedback gain is a feedback gain of an integral element.

9. The vehicular opening/closing body control device according to claim 8, wherein the processor gradually increases the output when the output is generated in the motor and the opening/closing body does not move in the closing direction by a predetermined amount or more.

10. The vehicular opening/closing body control device according to claim 8, wherein when the opening/closing body moves in the closing direction by a predetermined amount or more, or when the movement speed of the opening/closing body reaches a predetermined initial target value, or when a predetermined time has elapsed from a time when the processor generates the output in the motor, the processor starts the feedback control.

11. The vehicular opening/closing body control device according to claim 6, wherein the second position is closer to the fully closed position than an intermediate position between a fully open position and the fully closed position.

12. The vehicular opening/closing body control device according to claim 11, wherein the second position refers to each position in a range from the fully closed position to a predetermined distance in an opening direction.

13. The vehicular opening/closing body control device according to claim 11, wherein the target value corresponding to the position of the opening/closing body increases as the opening/closing body moves from the fully open position toward a third position in a closing direction, and is constant as the opening/closing body moves from the third position to a fourth position in the closing direction; the target value decreases as the opening/closing body moves from the fourth position toward a fifth position in the closing direction, and is constant as the opening/closing body moves from the fifth position to the fully closed position in the closing direction, the initial low speed section is from the fifth position to the fully closed position in the closing direction.

* * * * *